US012062282B2

United States Patent
Liu et al.

(10) Patent No.: US 12,062,282 B2
(45) Date of Patent: Aug. 13, 2024

(54) SYSTEMS AND METHODS FOR MATCHING OBJECTS IN COLLABORATIVE PERCEPTION MESSAGES USING MULTIPLE ADAPTIVE THRESHOLDS

(71) Applicant: Toyota Motor Engineering & Manufacturing North America, Inc., Plano, TX (US)

(72) Inventors: Hansi Liu, New Brunswick, NJ (US); Hongsheng Lu, San Jose, CA (US); Rui Guo, San Jose, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 157 days.

(21) Appl. No.: 17/498,238

(22) Filed: Oct. 11, 2021

(65) Prior Publication Data
US 2023/0113322 A1 Apr. 13, 2023

(51) Int. Cl.
*G08G 1/09* (2006.01)
*H04W 4/46* (2018.01)

(52) U.S. Cl.
CPC .............. *G08G 1/093* (2013.01); *H04W 4/46* (2018.02)

(58) Field of Classification Search
CPC .................................. G08G 1/093; H04W 4/46
See application file for complete search history.

(56) References Cited

U.S. PATENT DOCUMENTS 9,476,983 B2  10/2016 Zeng

FOREIGN PATENT DOCUMENTS

| CN | 104065932 A |   | 9/2014  |            |
|----|-------------|---|---------|------------|
| CN | 106407677 A | * | 2/2017  | G16Z 99/00 |
| CN | 107578007 A |   | 1/2018  |            |
| CN | 106503270 B |   | 2/2020  |            |
| CN | 111220998 A | * | 6/2020  | G01S 17/66 |

(Continued)

OTHER PUBLICATIONS

Gao, et al., "Regularized Graph Matching for Correspondence Identification under Uncertainty in Collaborative Perception", Jul. 2020, Toyota Motor North America, Robotics: Science and Systems 2020 (Year: 2020).*

(Continued)

*Primary Examiner* — Curtis A Kuntz
*Assistant Examiner* — James E Munion
(74) *Attorney, Agent, or Firm* — Dinsmore & Shohl LLP

(57) ABSTRACT

A method includes calculating a first adaptive threshold based on uncertainty of a first parameter of a first collaborative perception message (CPM) from a first node and uncertainty of the first parameter of a second CPM from a second node, calculating a second adaptive threshold based on uncertainty of a second parameter of the first CPM and uncertainty of the second parameter of the second CPM, obtaining a first association matrix by filtering out one or more pairs whose score is greater than the first adaptive threshold, obtaining a second association matrix by filtering out one or more pairs whose score is greater than the second adaptive threshold, obtaining a fused association matrix based on the first association matrix and the second association matrix, and implementing a fusion algorithm on the fused associated matrix to obtain correspondence identification among objects.

20 Claims, 9 Drawing Sheets

(56) References Cited

FOREIGN PATENT DOCUMENTS

| | | | |
|---|---|---|---|
| CN | 111220998 A | 6/2020 | |
| WO | 2018020044 A1 | 2/2018 | |
| WO | 2020257642 A1 | 12/2020 | |
| WO | WO-2020257642 A1 * | 12/2020 | ........... G06Q 10/063 |

OTHER PUBLICATIONS

Gao and Zhang, "Bayesian Deep Graph Matching for Correspondence Identification in Collaborative Perception", Jul. 2021, Human-Centered Robotics Lab, Colorado School of Mines, Robotics: Science and Systems 2021 (Year: 2021).*

Peng Gao, et al.; "Bayesian Deep Graph Matching for Correspondence Identification in Collaborative Perception"; Journal Robotics: Science and Systems 2021, Jul. 12, 2021; Virtual Seminar; URL:http://www.roboticsproceedings.org/rss17/p022.pdf.

Peng Gao, et al.; "Regularized Graph Matching for Correspondence Identification under Uncertainty in Collaborative Perception"; Journal Robotics: Science and Systems 2020, Jul. 12, 2020; Corvalis, Oregon, USA; URL:http://www.roboticsproceedings.org/rss16/p012.pdf.

* cited by examiner

|     | 502 | 504 | 506 |
| --- | --- | --- | --- |
| 512 | 1 | 0 | 0 |
| 514 | 0 | 0 | 1 |
| 516 | 0 | 0 | 0 |

470

|     | 502 | 504 | 506 |
| --- | --- | --- | --- |
| 512 | 1 | 0 | 0 |
| 514 | 0 | 0 | 1 |
| 516 | 0 | 0 | 0 |

610

|     | 502 | 504 | 506 |
| --- | --- | --- | --- |
| 512 | 1 | 0 | 0 |
| 514 | 0 | 0 | 1 |
| 516 | 0 | 0 | 0 |

|     | 502 | 504 | 506 |
| --- | --- | --- | --- |
| 512 | 1 | 0 | 0 |
| 514 | 0 | 0 | 1 |
| 516 | 0 | 0 | 0 |

470

|     | 502 | 504 | 506 |
| --- | --- | --- | --- |
| 512 | ? | 0 | 0 |
| 514 | 0 | 0 | 1 |
| 516 | 0 | 0 | 0 |

620

|     | 502 | 504 | 506 |
| --- | --- | --- | --- |
| 512 | 0 | 0 | 0 |
| 514 | 0 | 0 | 1 |
| 516 | 0 | 0 | 0 |

SYSTEMS AND METHODS FOR MATCHING OBJECTS IN COLLABORATIVE PERCEPTION MESSAGES USING MULTIPLE ADAPTIVE THRESHOLDS

TECHNICAL FIELD

The present disclosure relates to systems and methods for matching objects in collaborative perception messages using multiple adaptive thresholds.

BACKGROUND

Vehicles communicate messages such as basic safety messages (BSMs), collaborative perception messages (CPMs), personal safety messages (PSMs) via vehicle to vehicle communication (V2V) or vehicle to everything communication (V2X). These messages may be used to augment a vehicle's local dynamic map to support various onboard applications, e.g., collision avoidance, navigation, etc. When a vehicle receives multiple messages from multiple vehicles and generates a local dynamic map based on the received messages, it is difficult to identify the same object in the multiple messages because of uncertainty of the location of the object.

Accordingly, a need exists for systems and methods for accurately identifying correspondence among objects in multiple messages.

SUMMARY

The present disclosure provides systems and methods for matching objects in messages received from multiple vehicles, such as collaborative perception messages, using multiple adaptive thresholds.

In one embodiment, a method includes calculating a first adaptive threshold based on uncertainty of a first parameter of a first collaborative perception message (CPM) from a first node and uncertainty of the first parameter of a second CPM from a second node, calculating a second adaptive threshold based on uncertainty of a second parameter of the first CPM and uncertainty of the second parameter of the second CPM, obtaining a first association matrix by filtering out one or more pairs whose score is greater than the first adaptive threshold, obtaining a second association matrix by filtering out one or more pairs whose score is greater than the second adaptive threshold, obtaining a fused association matrix based on the first association matrix and the second association matrix, and implementing a fusion algorithm on the fused associated matrix to obtain correspondence identification among objects.

In another embodiment, a vehicle includes a network interface configured to: receive a first collaborative perception message (CPM) from a first node; and receive a second CPM from a second node, and a controller programmed to: calculate a first adaptive threshold based on uncertainty of a first parameter of the first CPM and uncertainty of the first parameter of the second CPM; calculate a second adaptive threshold based on uncertainty of a second parameter of the first CPM and uncertainty of the second parameter of the second CPM; obtain a first association matrix by filtering out one or more pairs whose score is greater than the first adaptive threshold; obtain a second association matrix by filtering out one or more pairs whose score is greater than the second adaptive threshold; obtain a fused association matrix based on the first association matrix and the second association matrix; and implement a fusion algorithm on the fused associated matrix to obtain correspondence identification among objects.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 6A depicts fusing association matrices, according to one or more embodiments shown and described herein;

FIG. 6B depicts fusing association matrices, according to one or more embodiments shown and described herein.

DETAILED DESCRIPTION

The embodiments disclosed herein include systems and methods for identifying correspondence among objects specified in messages such as collaborative perception messages using multiple adaptive thresholds. Updating a local dynamic map may be implemented by stacking up incoming objects included in messages from other vehicles onto a current map. However, the messages from other vehicles, e.g., DSRC V2X messages, include noises, the observations of objects reported in the messages retain uncertainties. The uncertainties make difficult to accurately determine whether two objects reported in different messages are the same object or not. Using a single adaptive threshold to filter out false positives of correspondences between pairs of objects may increase the accuracy of object correspondence. However, there may be still false positives even after filtering out false positives using a single adaptive threshold. The present disclosure utilizes multiple adaptive thresholds to filter out additional false positives that a single adaptive threshold may not filter out.

Figure 1A:
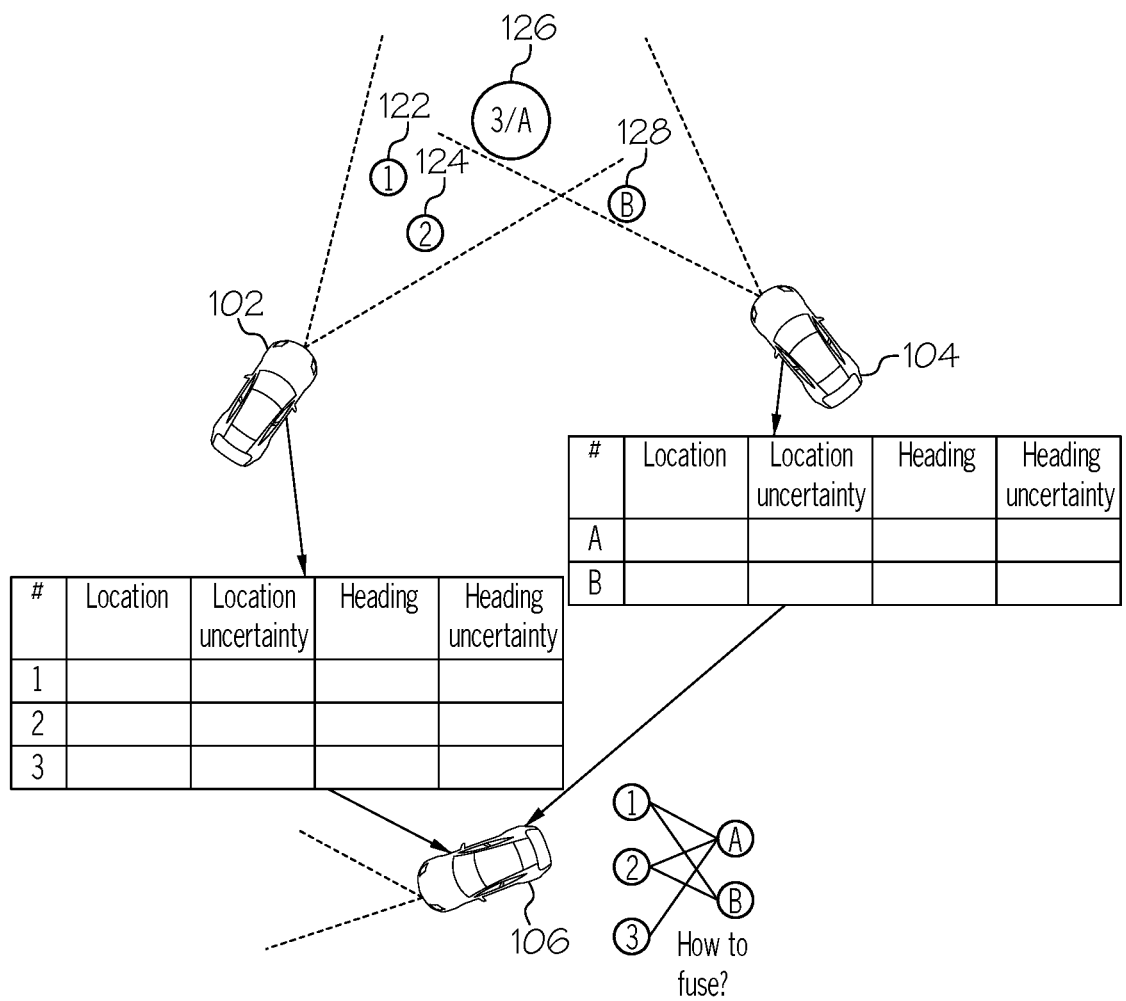
FIG. 1A schematically depicts a system for identifying correspondence among objects that are included in collaborative perception messages, in accordance with one or more embodiments shown and described herewith.

FIG. 1A schematically depicts a system for identifying correspondence among objects that are included in collaborative perception messages, in accordance with one or more embodiments shown and described herewith.

By referring to FIG. 1A, a vehicle 106 receives messages from a vehicle 102 and a vehicle 104. Each of the vehicles 102, 104, 106 may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. The messages may be collaborative perception messages (CPMs). In some embodiments, the messages may be other type of messages including, but not limited to, basic safety messages (BSMs), personal safety messages (PSMs), etc.

The vehicle 102 may sense objects 122, 124, and 126 using its sensors, for example, LIDAR sensors, radar sensors, sonar sensors, or other types of sensors. Based on the sensed information, the vehicle 102 may generate a first CPM that includes locations of the objects 122, 124, and 126. The first CPM may also include the headings of the objects 122, 124, and 126. Then, the vehicle 102 transmits the first CPM to the vehicle 106. The vehicle 102 may also transmit the location and/or heading of the vehicle 102 to the vehicle 106. Similarly, the vehicle 104 may sense objects 126 and 128 using its sensors, for example, LIDAR sensors, radar sensors, sonar sensors, or other types of sensors. Based on the sensed information, the vehicle 104 may generate a second CPM that includes locations of the objects 126 and 128. The second CPM may also include the headings of the objects 126 and 128. Then, the vehicle 104 transmits the second CPM to the vehicle 106. The vehicle may also transmit the location and/or heading of the vehicle 104 to the vehicle 106. The vehicle 106 may match objects included in the first CPM with objects included in the second CPM using a fusion algorithm. In embodiments, the vehicle 106 may use a bipartite graph, i.e., a Hungarian algorithm, with feature differences to match a pair of objects. In this example, the vehicle 106 may match the object 126 identified by the vehicle 102 with the object 126 identified by the vehicle 104.

Figure 1B:
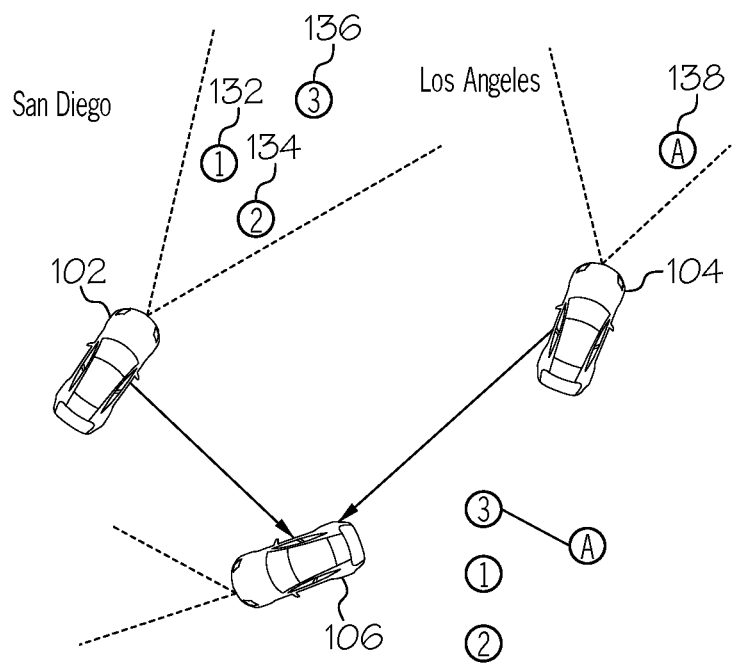
FIG. 1B schematically depicts a system for identifying correspondence among objects that are included in collaborative perception messages, in accordance with one or more embodiments shown and described herewith.

The issue of using the Hungarian algorithm is that the Hungarian algorithm always tries to match at least a pair of objects even if a pair of objects are at drastically different locations as illustrated in FIG. 1B. By referring to FIG. 1B, the vehicle 102 may sense objects 132, 134, 136 using its sensors. Based on the sensed information, the vehicle 102 may generate a first CPM that includes locations of the objects 132, 134, 136. Then, the vehicle 102 transmits the first CPM to the vehicle 106. The vehicle 102 may also transmit the location and/or heading of the vehicle 102 to the vehicle 106. Similarly, the vehicle 104 may sense an object 138 using its sensors. Based on the sensed information, the vehicle 104 may generate a second CPM that includes the location of the object 138. Then, the vehicle 104 transmits the second CPM to the vehicle 106. The vehicle may also transmit the location and/or heading of the vehicle 104 to the vehicle 106. In contrast with the example of FIG. 1A, in this example, the vehicle 102 and the vehicle 104 are located far from each other. For example, the vehicle 102 is located in San Diego, and the vehicle 104 is located in Los Angeles. Since the vehicles 102 and 104 are located far from each other, no matching should be made between the objects identified by the vehicle 102 and the objects identified by the vehicle 104. However, the Hungarian algorithm always matches at least one pair. Thus, in this example, the vehicle 106 may erroneously match the object 136 with the object 138 even though the object 136 is clearly different from the object 138. Thus, the present disclosure prunes any match that is likely to be false using an adaptive threshold that is generated based on uncertainties of data, e.g., uncertainties of locations of detected objects, and uncertainties of locations of vehicles. The details of calculating an adaptive threshold will be described in detail below.

Figure 2:
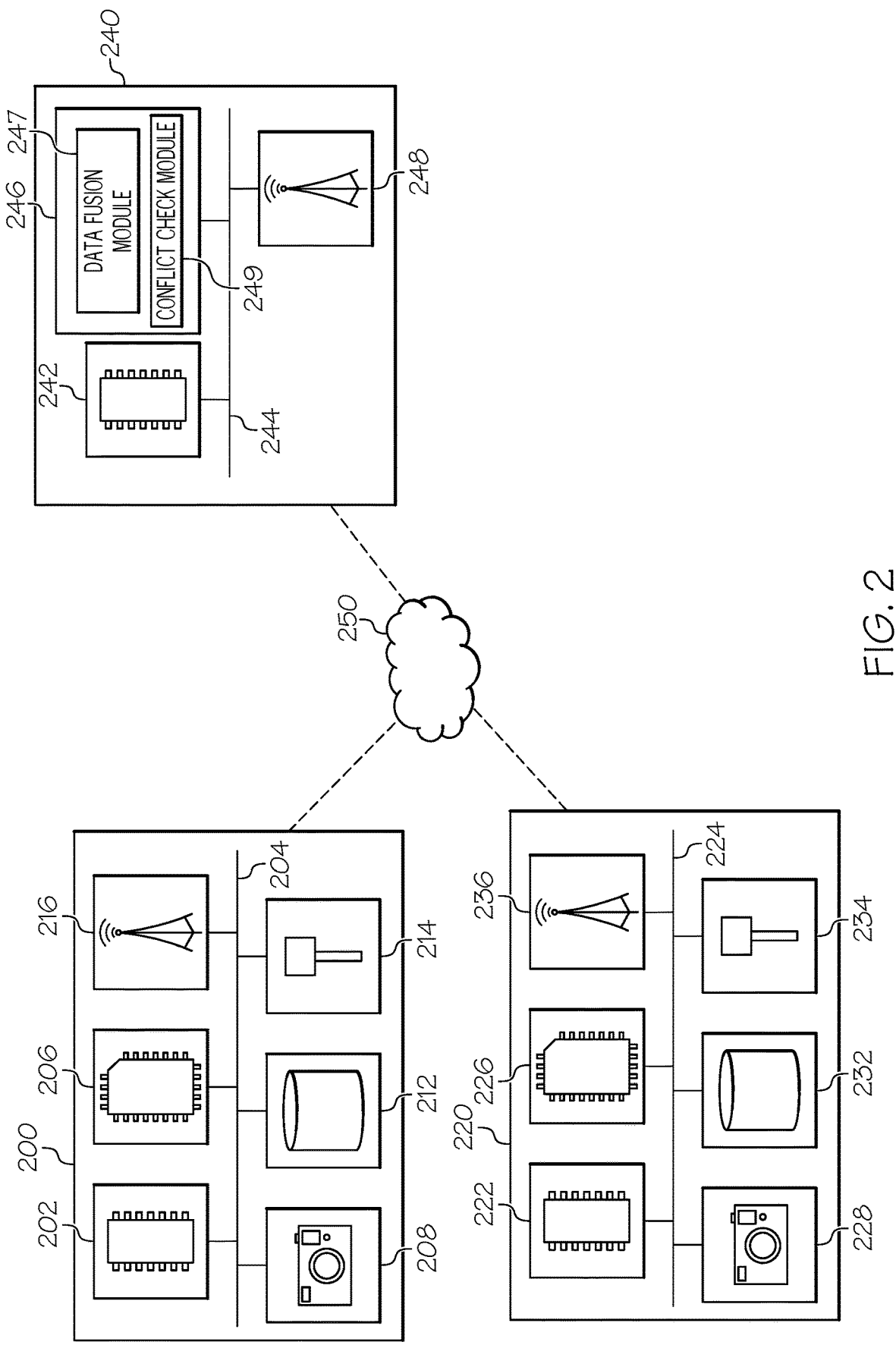
FIG. 2 depicts a schematic diagram of a system for fusing data in CPMs using multiple adaptive thresholds, according to one or more embodiments shown and described herein.

FIG. 2 depicts a schematic diagram of a system for fusing data in CPMs using an adaptive threshold, according to one or more embodiments shown and described herein. The system includes a first vehicle system 200, a second vehicle system 220, and an edge system 240. While FIG. 2 depicts that two vehicle systems communicate with the edge system 240, more than two vehicle systems may communicate with the edge system 240.

It is noted that, while the first vehicle system 200 and the second vehicle system 220 are depicted in isolation, each of the first vehicle system 200 and the second vehicle system 220 may be included within an edge node such as a vehicle in some embodiments, for example, respectively within the vehicles 102 and 104 of FIGS. 1A and 1B. Similarly, the edge system 240 may be included within the vehicle 106 of FIGS. 1A and 1B. Alternatively, the edge system 240 may be included d within an edge server or a road side unit that communicates with the vehicles 102 and 104. In embodiments in which each of the first vehicle system 200 and the second vehicle system 220 is included within an edge node, the edge node may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the edge node may be an edge server that communicates with a plurality of vehicles in a region and communicates with another vehicle, such as the vehicle 106.

The first vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 202 along with the one or more memory modules 206 may operate as a controller for the first vehicle system 200.

Referring still to FIG. 2, the first vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate a vehicle.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar may be used to obtain a rough depth and speed information for the view of the first vehicle system 200.

The first vehicle system 200 comprises a satellite antenna 214 coupled to the communication path 204 such that the communication path 204 communicatively couples the satellite antenna 214 to other modules of the first vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The first vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of a vehicle, e.g., the edge node. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the first vehicle system 200 comprises network interface hardware 216 for communicatively coupling the first vehicle system 200 to the second vehicle system 220 and/or the edge system 240. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the first vehicle system 200 may transmit its data to the second vehicle system 220 or the edge system 240. For example, the network interface hardware 216 of the first vehicle system 200 may transmit messages such as BSMs, CPMs, PSMs to the edge system 240.

The first vehicle system 200 may connect with one or more external vehicle systems (e.g., the second vehicle system 220) and/or external processing devices (e.g., the edge system 240) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the first vehicle system 200 may be communicatively coupled to the edge system 240 by the network 250. In one embodiment, the network 250 may include one or more computer networks (e.g., a personal area network, a local area network, or a wide area network), cellular networks, satellite networks and/or a global positioning system and combinations thereof. Accordingly, the first vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the second vehicle system 220 includes one or more processors 222, one or more memory modules 226, one or more sensors 228, one or more vehicle sensors 232, a satellite antenna 234, and a communication path 224 communicatively connected to the other components of the second vehicle system 220. The components of the second vehicle system 220 may be structurally similar to and have similar functions as the corresponding components of the first vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the communication path 224 corresponds to the communication path 204, and the network interface hardware 236 corresponds to the network interface hardware 216).

Still referring to FIG. 2, the edge system 240 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The one or more memory modules 246 may include a data fusion module 247 and a conflict check module 249.

The data fusion module 247 determines association among objects in CPMs received from vehicles, e.g., from the first vehicle system 200 and the second vehicle system 220, using an adaptive threshold value. The data fusion module 247 may calculate the adaptive threshold using a trained mapping function f( ). Training of a mapping function f( ) may be implemented using machine learning algorithms such as a linear model, a logistic regression model, and a neural network model.

The mapping function f( ) receives uncertainties of CPMs as inputs and outputs a threshold, e.g., a distance threshold. The uncertainties of CPMs may include uncertainties of locations of vehicles that transmitted the CPMs and uncertainties of locations of objects detected by the vehicles. The uncertainties of the locations of the vehicles and the uncertainties of the locations of the objects may be represented as covariance matrices. When the training is implemented by a linear model, the training uses the following equation.

$$f(A)=b \qquad \text{Equation 1}$$

A represents uncertainties of CPMs, e.g., covariance matrices of locations of vehicles and covariance matrices of locations of detected object. f( ) is a mapping function that outputs a distance threshold $b^{pred}$ based on the input A. Here $b^{pred}$ is a predicted distance threshold for determining whether two objects are the same object or not. For example, if the distance between two objects in two different CPMs is less than the predicted distance threshold, then it is determined that the two objects are the same object. The training of f( ) may be implemented by comparing a ground truth threshold $b^{GND}$ and the predictive distance threshold $b^{pred}$. The ground truth threshold is a threshold distance that is used to accurately determine whether two objects are the same objects or not. The training of f( ) may be implemented until the prediction error of norm ($b^{pred}$-$b^{GND}$) is less than a predetermined value. While the training may be implemented in the edge system 240, the training of the mapping function may be implemented by other entity, for example, a cloud server, and the cloud server may transmit the trained mapping function to the edge system 240.

Then, the data fusion module 247 may use the trained mapping function f( ) to determine an adaptive threshold based on real time inputs. For example, by referring to FIG. 1B, the data fusion module 247 receive a first CPM from the first vehicle 102 and a second CPM from the second vehicle 104. The first CPM may include the location of the first vehicle 102 and the locations of the detected objects 132, 134, 136. Similarly, the second CPM may include the location of the second vehicle 104 and the location of the detected object 138. The data fusion module 247 may obtain uncertainties of the locations of the first vehicle 102 and the objects 132, 134, 136. For example, the uncertainties may be covariance matrices for the locations of the first vehicle 102 and the objects 132, 134, 136. Similarly, the second CPM may include the location of the second vehicle 104 and the location of the detected object 138. Similarly, the second CPM may include the location of the second vehicle 104 and the location of the detected object 138. The data fusion module 247 may obtain uncertainties of the locations of the second vehicle 104 and the object 138. For example, the uncertainties may be covariance matrices for the locations of the second vehicle 104 and the object 138. Then, the data fusion module 247 input the covariance matrices for the locations of the first vehicle 102 and the objects 132, 134, 136 and the covariance matrices for the locations of the second vehicle 104 and the object 138 to the trained mapping function f( ). In response, the trained mapping function f( ) outputs an adaptive threshold distance b.

The data fusion module 247 obtains a score matrix that includes scores representing distances between pairs of objects in CPMs. By referring to FIG. 1B, the data fusion module 247 may transform the covariance matrices of the locations of the objects 132, 134, 136 into detections in the coordinates of the ego vehicle 106. Similarly, the data fusion module 247 may transform the covariance matrix of the location of the object 138 into detection in the coordinates of the ego vehicle 106. Then, the data fusion module 247 obtains a score matrix including scores for pairs of detected objects. For example, the score matrix may include a score for a pair of the object 132 and the object 138, a score for a pair of the object 134 and the object 138, a score for a pair of the object 136 and the object 138. The score may represent a distance between two objects. Then, the data fusion module 247 may compare the scores of the score matrix with the adaptive threshold distance b to filter out pairs of objects and obtain an association matrix that represents correspondence among objects. In this case, all three scores of the score matrix are bigger than the adaptive threshold because the objects 132, 134, 136 are located far from the object 138 and the adaptive threshold distance is set to be relatively small to identify two different objects that are relatively close to each other. Accordingly, the data fusion module 247 may determine that there is no corresponding between a group of the objects 132, 134, 136 and the object 138.

The data fusion module 247 may obtain another adaptive threshold based on uncertainty of another parameter of a first CPM from the first vehicle 102 and a second CPM from the second vehicle 104. For example, another parameter may be a heading of a vehicle or a detected object. The data fusion module 247 may have another mapping function, e.g., f2( ), for calculating another adaptive threshold. The mapping function f2( ) may receive uncertainties of CPMs as inputs and outputs another adaptive threshold, e.g., an adaptive heading threshold. The data fusion module 247 may obtain a score matrix that includes scores representing differences in headings between pairs of objects in CPMs. The data fusion module 247 may compare the scores of the score matrix with the adaptive heading threshold to filter out pairs of objects and obtain a second association matrix.

The data fusion module 247 may obtain a third adaptive threshold based on uncertainty of another parameter of a first CPM from the first vehicle 102 and a second CPM from the second vehicle 104. For example, another parameter may be a deep feature of a vehicle or a detected object. The data fusion module 247 may have another mapping function, e.g., f3( ), for calculating another adaptive threshold. The mapping function f3( ) may receive uncertainties of CPMs as inputs and outputs another adaptive threshold, e.g., an adaptive deep feature threshold. The data fusion module 247 may obtain a score matrix that includes scores representing differences in deep features between pairs of objects in CPMs. The data fusion module 247 may compare the scores of the score matrix with the adaptive deep feature threshold to filter out pairs of objects and obtain a third association matrix.

The conflict check module 249 checks conflicts between two association matrices and resolves the conflicts using adaptive conflict thresholds. For example, the conflict check module 249 learns multi-feature adaptive conflict thresholds (e.g., thresh_a, thresh_b, thresh_c) using a conflict checking function go. Each of the multi-feature adaptive conflict thresholds may be related to one of the parameters above. For example, the thresh_a is related to the parameter of a location, the thresh_b is related to the parameter of a heading, and the thresh_c is related to the parameter of a deep feature. The conflict checking function g( ) receives conflict elements of associates matrices as inputs and outputs multi-feature adaptive conflict thresholds per Equation (2) below.

$$[\text{thresh}\_a, \text{thresh}\_b, \text{thresh}\_c] = g(\text{conflict elements of the association matrices}) \quad \text{Equation (2)}$$

The conflict check module 249 may implement model fitting based on many difference scenarios and ground truth data. Specifically, the conflict check module 249 inputs conflict elements of association matrices into the conflict checking function g( ) and obtains conflict thresholds. The conflict check module 249 trains the conflict checking function g( ) such that the error between the obtained conflict thresholds and ground truth is minimized. Once the conflict checking function g( ) is sufficiently trained, the conflict check module 249 uses the trained conflict checking function g( ) to obtain adaptive conflict thresholds.

Figure 3:
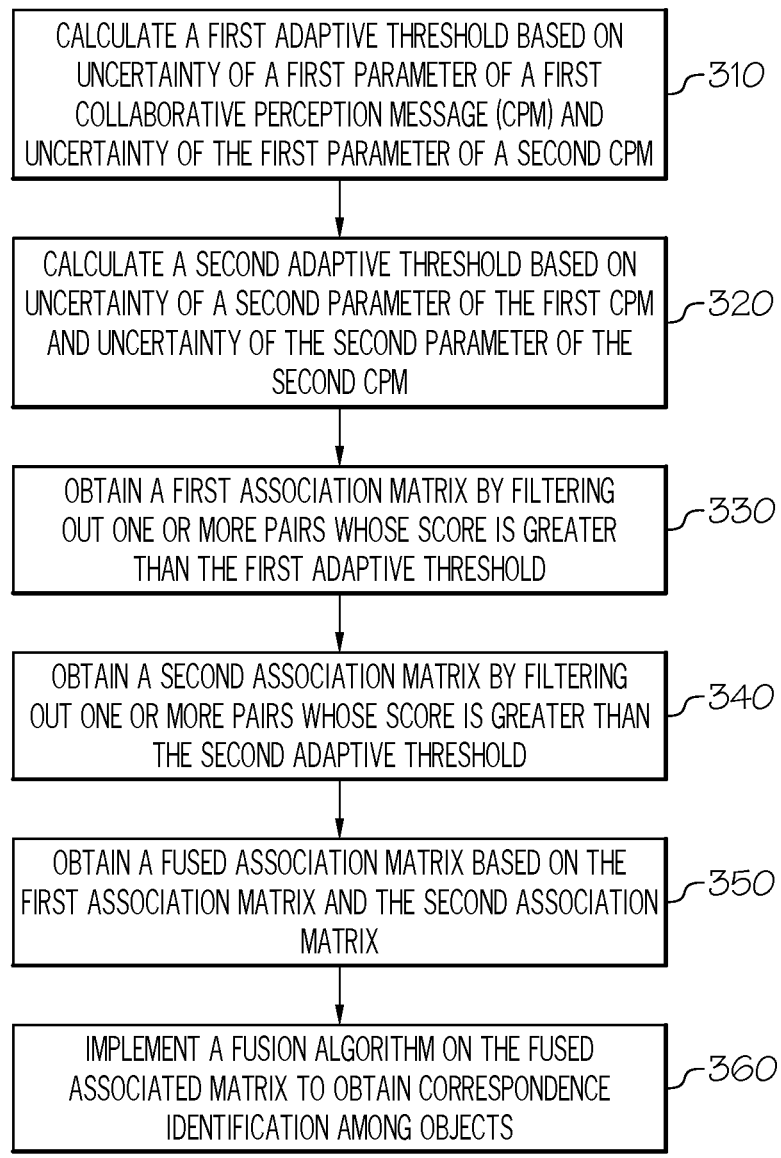
FIG. 3 depicts a flowchart for determining correspondence among objects in CPMs using multiple adaptive thresholds, according to one or more embodiments shown and described herein.

FIG. 3 depicts a flowchart for determining correspondence among objects in CPMs using multiple adaptive thresholds, according to one or more embodiments shown and described herein.

In step 310, an edge node calculates a first adaptive threshold based on uncertainty of a first parameter of a first collaborative perception message (CPM) received from a first node and uncertainty of the first parameter of a second CPM received from a second node.

Figure 5A:
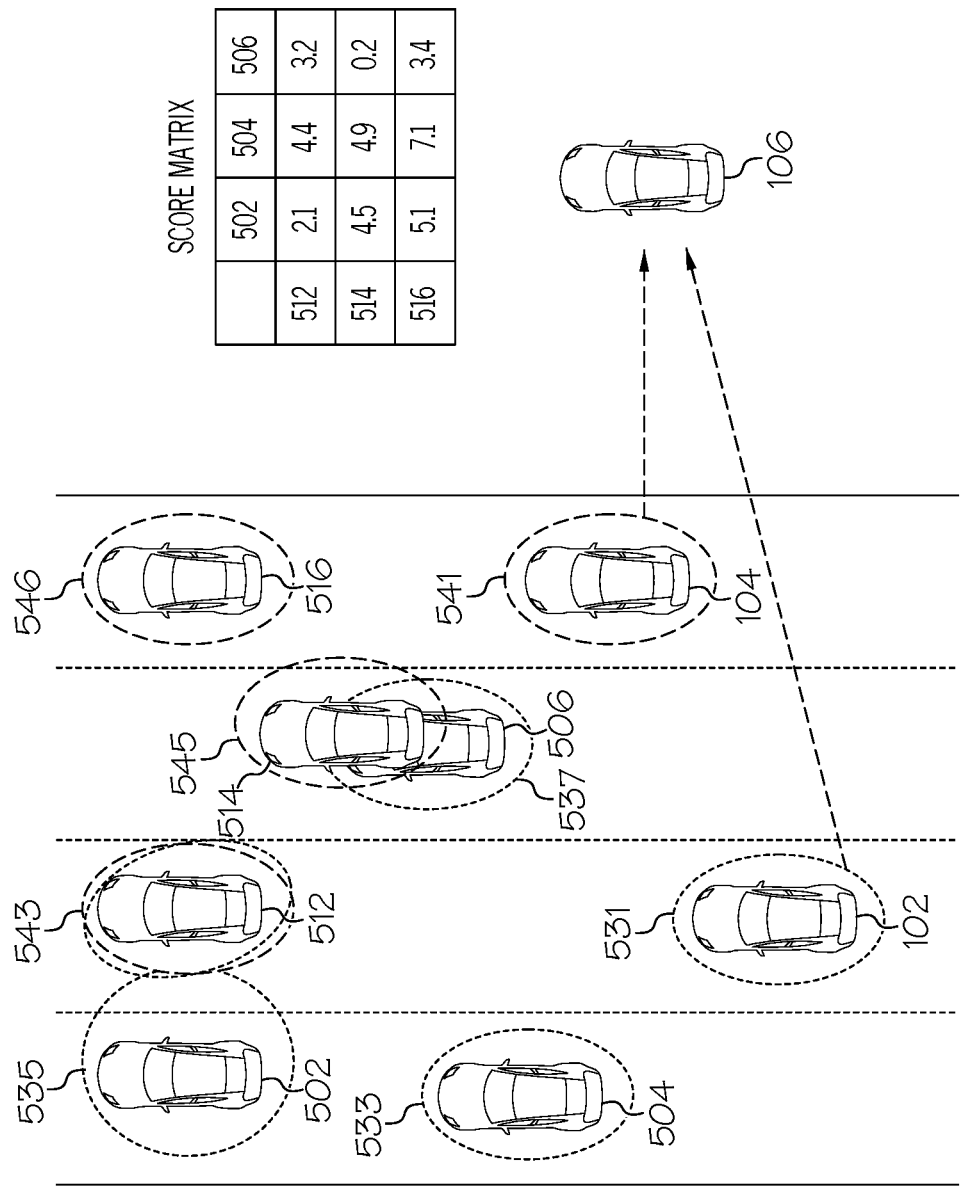
FIG. 5A depicts an example scenario where an ego vehicle identifies correspondence among objects that are included in collaborative perception messages from other vehicles using locations of the objects, according to one or more embodiments shown and described herein.

By referring to FIG. 5A, the edge node may be the vehicle 106 and the first node may be the vehicle 102. The vehicle 106 receives a first CPM from the vehicle 102. The first CPM includes locations of the vehicle 102 and the detected objects 502, 504, 506. The locations of the vehicle 102 and the detected objects 502, 504, 506 may not be exact locations due to noise or calculation errors. Thus, uncertainties of the locations of the vehicle 102 and the detected objects 502, 504, 506 may be represented as covariance matrices. The vehicle 106 receives a second CPM from the vehicle 104. The second CPM includes the location of the vehicle 104 and the locations of the detected objects 512, 514, 516. The locations of the vehicle 104 and the detected objects 512, 514, 516 may not be exact locations. Thus, uncertainties of the location of the vehicle 104 and the locations of the detected objects 512, 514, 516 may be represented as covariance matrices.

In embodiments, by referring to FIGS. 2 and 5A, the data fusion module 247 of the vehicle 106 may calculate a first adaptive threshold based on the uncertainty of the first CPM from the vehicle 102 and the uncertainty of the second CPM from the vehicle 104. Specifically, by referring to Equation 1 above, the data fusion module 247 inputs the uncertainty of the first CPM and the uncertainty of the second CPM to the trained mapping function, e.g., a first trained mapping function f1( ) which outputs a first adaptive threshold b1. The first trained mapping function may have been trained using uncertainties of locations of CPMs and ground truth.

The uncertainty of the first CPM from the vehicle 102 may include the uncertainties of the locations of the vehicle 102 and the objects 502, 504, 506 detected by the vehicle 102. Similarly, the uncertainty of the second CPM from the vehicle 104 may include the uncertainties of the locations of the vehicle 104 and the objects 512, 514, 516 detected by the vehicle 104. The location uncertainty may be defined as a scope of the location of a vehicle or a detected object. For example, the ellipses 531, 533, 535, 537 represent the uncertainties of the locations of the vehicle 102 and objects 502, 504, 506, respectively. The ellipses 541, 543, 545, 547 represent the uncertainties of the locations of the vehicle 104 and objects 512, 514, 516, respectively. The size of an ellipse increases as the uncertainty becomes greater.

In embodiments, the uncertainties of the first CPM may be represented as covariance matrices of the locations of the vehicle 102 and the objects 502, 504, 506. The uncertainties of the second CPM may be represented as covariance matrices of the locations of the vehicle 104 and the objects 512, 514, 516. In this example, the first adaptive threshold may be 3.1.

Referring back to FIG. 3, in step 320, the edge node calculates a second adaptive threshold based on uncertainty of a second parameter of the first CPM and uncertainty of the second parameter of the second CPM.

Figure 5B:
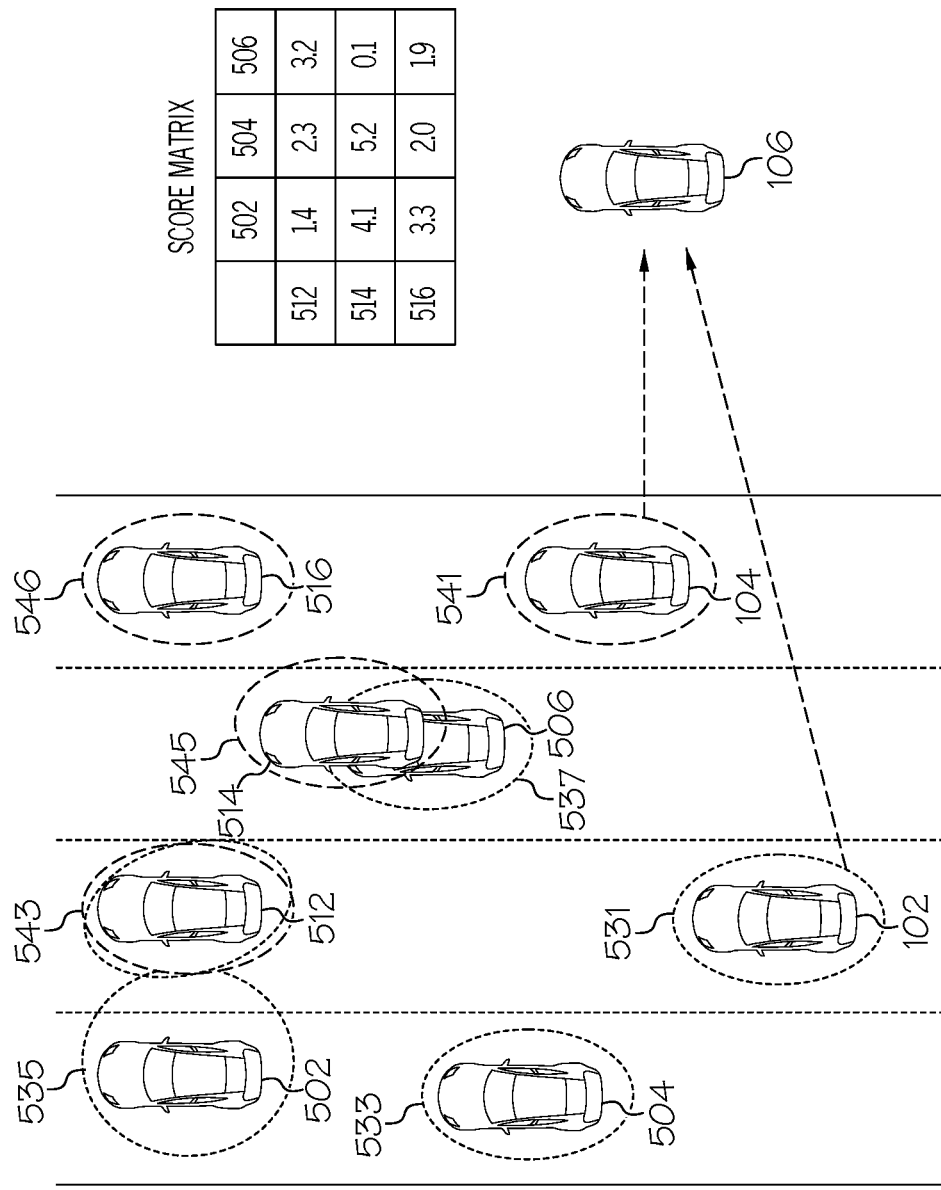
FIG. 5B depicts an example scenario where an ego vehicle identifies correspondence among objects that are included in collaborative perception messages from other vehicles using locations of the objects, according to one or more embodiments shown and described herein.

By referring to FIG. 5B, the edge node may be the vehicle 106 and the first node may be the vehicle 102. The vehicle 106 receives a first CPM from the vehicle 102. The first CPM includes the heading of the vehicle 102 and headings of the detected objects 502, 504, 506. The heading of the vehicle 102 and the headings of the detected objects 502, 504, 506 may not be exact headings due to noise or calculation errors. Thus, uncertainties of the heading of the vehicle 102 and the headings of the detected objects 502, 504, 506 may be represented as covariance matrices. The vehicle 106 receives a second CPM from the vehicle 104. The second CPM includes the heading of the vehicle 104 and the headings of the detected objects 512, 514, 516. The heading of the vehicle 104 and the headings of the detected objects 512, 514, 516 may not be exact headings. Thus, uncertainties of the heading of the vehicle 504 and the headings of the detected objects 512, 514, 516 may be represented as covariance matrices.

In embodiments, by referring to FIGS. 2 and 5B, the data fusion module 247 of the vehicle 106 may calculate a second adaptive threshold based on the uncertainty of headings of the first CPM from the vehicle 102 and the uncertainty of the second CPM from the vehicle 104. Specifically, by referring to Equation 1 above, the data fusion module 247 inputs the uncertainty of the first CPM and the uncertainty of the second CPM to the trained mapping function, e.g., a second trained mapping function f2( ) which outputs a second adaptive threshold b2. The second trained mapping function f2( ) may have been trained using uncertainties of headings of CPMs and ground truth.

The uncertainty of the first CPM from the vehicle 102 may include the uncertainties of the headings of the vehicle 102 and the objects 502, 504, 506 detected by the vehicle 102. Similarly, the uncertainty of the second CPM from the vehicle 104 may include the uncertainties of the headings of the vehicle 104 and the objects 512, 514, 516 detected by the vehicle 104. The heading uncertainty may be defined as a scope of the heading of a vehicle or a detected object. For example, a shape of each of the ellipses 531, 533, 535, 537 may represent the uncertainties of the headings of the vehicle 102 and objects 502, 504, 506, respectively. Specifically, an ellipse closest to a circle has a high uncertainty of the heading and an ellipse closest to a bar shape or a rectangular with a certain orientation has a low uncertainty of the heading.

In embodiments, the uncertainties of the first CPM may be represented as covariance matrices of the headings of the vehicle 102 and the objects 502, 504, 506. The uncertainties of the second CPM may be represented as covariance matrices of the headings of the vehicle 104 and the objects 512, 514, 516. In this example, the second adaptive threshold may be 1.2.

Referring back to FIG. 3, in step 330, the edge node obtains a first association matrix by filtering out one or more pairs whose score is greater than the first adaptive threshold.

In embodiments, the edge node calculates scores for pairs of objects with respect to a distance between each of the pairs. Each of the pairs of objects includes one object in the first CPM and one object in the second CPM. By referring to FIG. 5A, the vehicle 106 may generate a 3 by 3 score matrix based on the first CPM and the second CPM as illustrated in FIG. 5. The first CPM includes information about the locations of the objects 502, 504, 506 and the second CPM includes information about the locations of the objects 512, 514, 516. Each of the scores in the score matrix may represent a value proportional to a distance between a pair of objects.

The vehicle 106 may transform the first CPM into detections in the coordinates of the vehicle 106 and transform the second CPM into detections in the coordinates of the vehicle 106. Then, the vehicle 106 may calculate scores for pairs of objects that are in the coordinates of the vehicle 106. For example, the score for the pair of the objects 502 and 512 is 2.1, the score for the pair of the objects 504 and 512 is 4.4, and the score for the pair of the objects 506 and 512 is 3.2. The score for the pair of the objects 502 and 514 is 4.5, the score for the pair of the objects 504 and 514 is 4.9, and the score for the pair of the objects 506 and 514 is 0.2. The score for the pair of the objects 502 and 516 is 5.1, the score for the pair of the objects 504 and 516 is 7.1, and the score for the pair of the objects 506 and 516 is 3.4.

Then, the edge node filters out one or more pairs whose score is greater than the first adaptive threshold to obtain a first association matrix. By referring to FIG. 5, in this example, the adaptive threshold is 3.1 determined in step 310. Then, the pairs whose score is greater than the adaptive threshold are filtered out to obtain a filtered matrix. Specifically, the pairs of the objects 504 and 512, the pairs of the objects 506 and 512, the pairs of the objects 502 and 514, the pairs of the objects 504 and 514, the pairs of the objects 502 and 516, the pairs of the objects 504 and 516, and the pairs of the objects 506 and 516 are filtered out. Then, the first association matrix includes only two pairs of potential correspondence: a pair of the objects 502 and 512 and a pair of the objects 506 and 514. For example, the first association matrix may be a matrix 470 illustrated in FIGS. 6A and 6B. In the first association matrix 470, zero indicates no correspondence between two objects and one indicates correspondence between two objects.

Referring back to FIG. 3, in step 340, the edge node obtains a second association matrix by filtering out one or more pairs whose score is greater than the second adaptive threshold.

In embodiments, the edge node calculates scores for pairs of objects with respect to a difference in headings between each of the pairs. Each of the pairs of objects includes one object in the first CPM and one object in the second CPM. By referring to FIG. 5B, the vehicle 106 may generate a 3 by 3 score matrix based on the first CPM and the second CPM as illustrated in FIG. 5. The first CPM includes information about the headings of the objects 502, 504, 506 and the second CPM includes information about the headings of the objects 512, 514, 516. Each of the scores in the score matrix may represent a value proportional to a difference in headings between a pair of objects.

The vehicle 106 may transform the first CPM into detections in the coordinates of the vehicle 106 and transform the second CPM into detections in the coordinates of the vehicle 106. Then, the vehicle 106 may calculate scores for pairs of objects that are in the coordinates of the vehicle 106. For example, the score for the pair of the objects 502 and 512 is 1.4, the score for the pair of the objects 504 and 512 is 2.3, and the score for the pair of the objects 506 and 512 is 3.4. The score for the pair of the objects 502 and 514 is 4.1, the score for the pair of the objects 504 and 514 is 5.2, and the score for the pair of the objects 506 and 514 is 0.1. The score for the pair of the objects 502 and 516 is 3.3, the score for the pair of the objects 504 and 516 is 2.0, and the score for the pair of the objects 506 and 516 is 1.9.

Then, the edge node filters out one or more pairs whose score is greater than the first adaptive threshold to obtain a first association matrix. By referring to FIG. 5B, in this example, the adaptive threshold is 1.2 determined in step 320. The pairs whose score is greater than the adaptive threshold are filtered out to obtain a filtered matrix. Specifically, the pairs of the objects 502 and 512, the pairs of the objects 504 and 512, the pairs of the objects 506 and 512, the pairs of the objects 502 and 514, the pairs of the objects 504 and 514, the pairs of the objects 502 and 516, the pairs of the objects 504 and 516, and the pairs of the objects 506 and 516 are filtered out. Then, the second association matrix includes only one pair of potential correspondence: a pair of the objects 506 and 514. For example, the second association matrix may be a matrix 474 illustrated in FIG. 6B. In the second association matrix 474, zero indicates no correspondence between two objects and one indicates correspondence between two objects.

In some embodiments, the adaptive threshold determined in step 320 may be 1.5. In this case, the second association matrix includes two pairs of potential correspondence: a pair of the objects 502 and 512 and a pair of the objects 506 and 514. For example, the second association matrix may be a matrix 472 illustrated in FIG. 6A.

Referring back to FIG. 3, in step 350, the edge node obtains a fused association matrix based on the first association matrix and the second association matrix obtained in steps 330 and 340.

By referring to FIG. 6B, the first association matrix 470 and the second association matrix 474 have a conflict in a cell for the objects 502 and 512. Specifically, the first association matrix 470 indicates correspondence between the objects 502 and 512 whereas the second association matrix 474 indicates no correspondence between the objects 502 and 512.

The edge node may address the conflict using adaptive conflict thresholds and obtain a fused association matrix. As discussed above, by referring to FIG. 2, the conflict check module 249 learns multi-feature adaptive conflict thresholds (e.g., thresh_a, thresh_b, thresh_c) using a conflict checking function go. Each of the multi-feature adaptive conflict thresholds may be related to one of the parameters above. For example, the thresh_a is related to the parameter of a location, the thresh_b is related to the parameter of a heading, and the thresh_c is related to the parameter of a deep feature.

Specifically, the conflict check module 249 inputs conflict elements of association matrices into the conflict checking function g( ) and obtains adaptive conflict thresholds, thresh_a, thresh_b, thresh_c as outputs. The conflict check module 249 addresses the conflicts using the obtained conflict thresholds. In this example, the conflict check module 249 predicts a correspondence for the conflicting cell (i.e., the cell for the objects 502 and 512) by comparing scores of the first association matrix 470 and the second association matrix 474 with the first adaptive conflict threshold, thresh_a and the second adaptive conflict threshold, thresh_b, respectively. Specifically, the conflict check module 249 predicts a matching for the cell of objects 502 and 512 if the score of objects 502 and 512 in the first association matrix 470 is less than thresh_a and the score of objects 502 and 512 in the second association matrix 474 is less than thresh_b. The conflict check module 249 predicts no matching for the cell of objects 502 and 512 if the score of objects 502 and 512 in the first association matrix 470 is greater than thresh_a or the score of objects 502 and 512 in the second association matrix 474 is greater than thresh_b.

In some embodiments, the first association matrix 470 and the second association matrix 472 contain the same correspondence as illustrated in FIG. 6A. In this case, a fused association matrix 610 is the same as the first association matrix and the second association matrix.

In step 360, the edge node implements a fusion algorithm on the fused association matrix to obtain correspondence identification among objects.

In embodiments, the fused association matrix includes one pair: a pair of the objects 506 and 514 as identified in step 350. Then, the edge node or the vehicle 106 may implement a fusion algorithm, e.g., Hungarian algorithm, to obtain correspondence between the object 506 and the object 514.

In this regard, the present disclosure fully exploits current CPM structure for multiple vehicles to achieve better collaborative perception. Multi-feature thresholds related to different parameters such as locations and headings effectively prune false matches that Hungarian algorithm may not be able to filter out. Utilization of multi-feature thresholds enhances accuracy of matching objects in CPMs.

Figure 4:
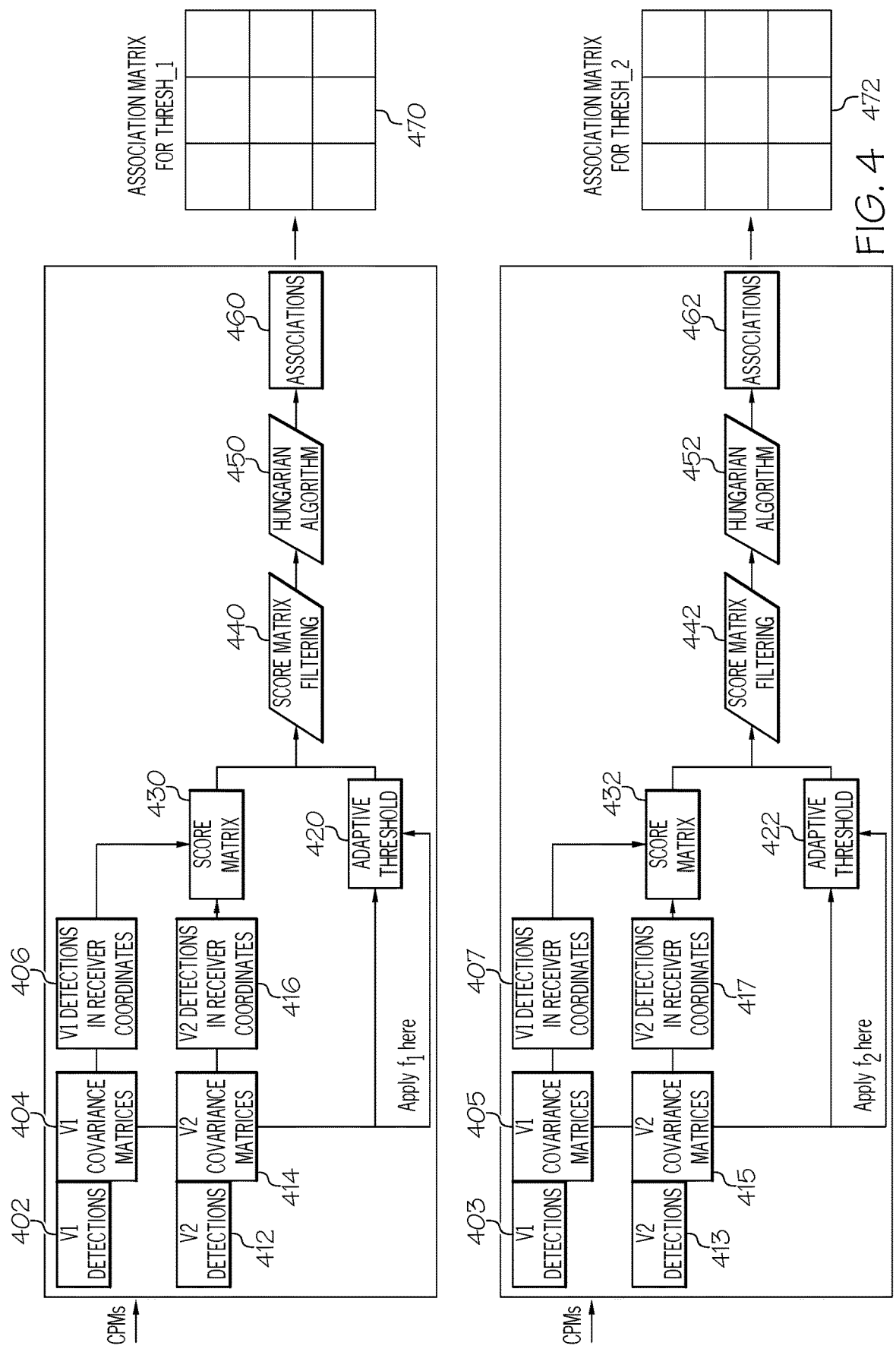
FIG. 4 depicts an overall system process implemented by an edge node for determining correspondence among objects in CPMs using multiple adaptive thresholds, according to one or more embodiments shown and described here.

FIG. 4 depicts an overall system process implemented by an edge node, according to one or more embodiments shown and described herein. In block 402, an edge node, e.g., the vehicle 106 in FIG. 1A, receives a first CPM from a first vehicle (e.g., the vehicle 102 in FIG. 1A) that includes detections of objects. The edge node obtains covariance matrices of the locations of the first vehicle and the detected objects in block 404. In parallel to blocks 402 and 404, in block 412, the edge node receives a second CPM from a second vehicle (e.g., the vehicle 104 in FIG. 1A) that includes detections of the objects. The edge node obtains covariance matrices of the locations of the second vehicle and the detected objects in block 414. The covariance matrices obtained in block 404 and the covariance matrices obtained in block 414 are input to the first mapping function f1( ) and the first mapping function outputs a first adaptive threshold in block 420. The first adaptive threshold is a threshold distance specifically tailored for the detections in blocks 402 and 412.

The edge node transforms the detections in block 402 to detections in the coordinates of the edge node in block 406. For example, the edge node calculates the relative positions of the location of the edge node and the location of the first vehicle, and transforms the coordinates of the objects in the first CPM (i.e., coordinates of the objects from the perspective of the first vehicle) to the coordinates of the objects from the perspective of the edge node based on the relative positions. Similarly, the edge node calculates the relative positions of the location of the edge node and the location of the second vehicle, and transforms the coordinates of the objects in the second CPM (i.e., coordinates of the objects from the perspective of the second vehicle) to the coordinates of the objects from the perspective of the edge node based on the relative positions.

In block 430, the edge node calculates a first score matrix (e.g., the score matrix in FIG. 5A) based on the coordinates of the objects obtained in block 406 and the coordinates of the objects obtained in block 416. Then, in block 440, the edge node filters out one or more pairs by comparing the scores in the first score matrix and the adaptive threshold obtained in block 420. After the filtering out process, the edge node implements a fusion algorithm such as a Hungarian algorithm on the filtered matrix in block 450. In some embodiments, the edge node may not implement the fusion algorithm. In block 460, the edge node obtains correspondence identification among objects and outputs the first association matrix 470 based on the first adaptive threshold thresh_1.

Similar process can be implemented for another parameter of CPMs, such as headings of CPMs. In block 403, an edge node, e.g., the vehicle 106 in FIG. 1A, receives a first CPM from a first vehicle (e.g., the vehicle 102 in FIG. 1A) that includes detections of objects. The edge node obtains covariance matrices of the headings of the first vehicle and the detected objects in block 405. In parallel to blocks 403 and 405, in block 413, the edge node receives a second CPM from a second vehicle (e.g., the vehicle 104 in FIG. 1A) that includes detections of the objects. The edge node obtains covariance matrices of the headings of the second vehicle and the detected objects in block 415. The covariance matrices obtained in block 405 and the covariance matrices obtained in block 415 are input to the second mapping function f2( ), and the second mapping function outputs a second adaptive threshold in block 422. The second adaptive threshold is a heading threshold specifically tailored for the detections in blocks 403 and 413.

The edge node transforms the detections in block 403 to detections in the coordinates of the edge node in block 407. For example, the edge node calculates the relative orientations of the edge node and the first vehicle, and transforms the coordinates of the objects in the first CPM (i.e., coordinates of the objects from the perspective of the first vehicle) to the coordinates of the objects from the perspective of the edge node based on the relative positions. Similarly, the edge node calculates the relative orientations of the edge node and the second vehicle, and transforms the coordinates of the objects in the second CPM (i.e., coordinates of the objects from the perspective of the second vehicle) to the coordinates of the objects from the perspective of the edge node based on the relative positions.

In block 432, the edge node calculates a second score matrix (e.g., the score matrix in FIG. 5B) based on the coordinates of the objects obtained in block 407 and the coordinates of the objects obtained in block 417. Then, in block 442, the edge node filters out one or more pairs by comparing the scores in the second score matrix and the second adaptive threshold obtained in block 422. After the filtering out process, the edge node implements a fusion algorithm such as a Hungarian algorithm on the filtered matrix in block 452. In some embodiments, the edge node may not implement the fusion algorithm. In block 462, the edge node obtains correspondence identification among objects and outputs the second association matrix 472 based on the second adaptive threshold thresh_2.

Figure 7:
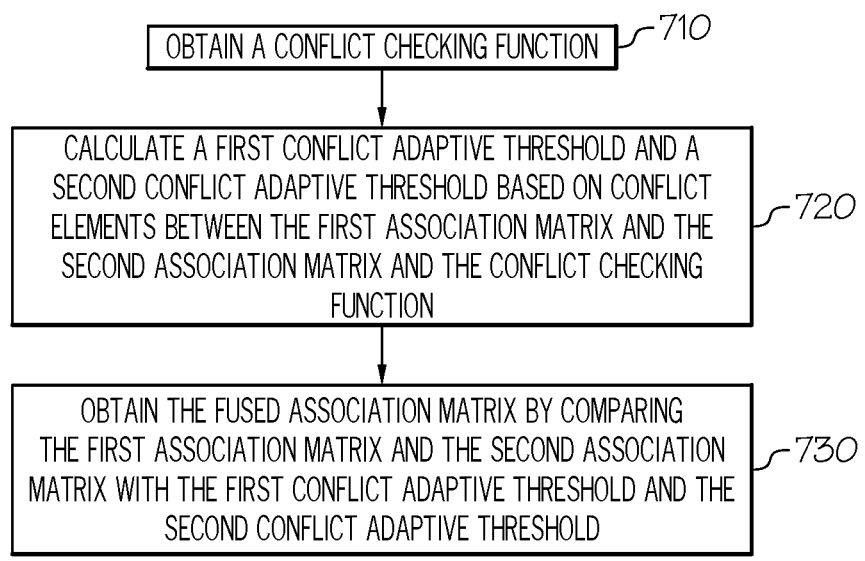
FIG. 7 is a flowchart for addressing conflicts between two association matrices using adaptive conflict thresholds, according to one or more embodiments shown and described herewith.

FIG. 7 is a flowchart for addressing conflicts between two association matrices using adaptive conflict thresholds, according to one or more embodiments shown and described herewith. Specifically, conflicts may exist between the first association matrix 470 and the second association matrix 472 in FIG. 4.

Referring back to FIG. 7, in step 710, the edge node obtains a conflict checking function. By referring to FIG. 2, the conflict check module 249 may obtain a conflict checking function g( ) by implementing machine learning on data of different scenarios. For example, the conflict check module 249 learns multi-feature adaptive conflict thresholds (e.g., thresh_a, thresh_b, thresh_c) using the conflict checking function go. Each of the multi-feature adaptive conflict thresholds may be related to one of the parameters above. For example, the thresh_a is related to the parameter of a location, the thresh_b is related to the parameter of a heading, and the thresh_c is related to the parameter of a deep feature. The conflict check module 249 may implement model fitting on the conflict checking function g( ) based on many difference scenarios to update the conflict checking function g( ).

In step 720, the edge node calculates a first adaptive conflict threshold and a second adaptive conflict threshold based on conflict elements between the first association matrix and the second association matrix and the conflict checking function. For example, the edge node may calculate the first adaptive conflict threshold and the second adaptive conflict threshold using the Equation 2 above. Specifically, the conflict checking function g( ) receives conflict elements between the first association matrix and the second association matrix as inputs and outputs the first threshold adaptive conflict threshold for this specific scenario thresh_a_sc (e.g., a scenario where conflicts exist between the first association matrix 470 and the second association matrix 474 in FIG. 6B) and the second adaptive conflict threshold for this specific scenario thresh_b_sc.

In step 730, the edge nodes obtains the fused association matrix by comparing the first association matrix and the second association matrix with the first adaptive conflict threshold thresh_a_sc and the second adaptive conflict threshold thresh_b_sc. Specifically, by referring to FIGS. 5A and 5B, the conflict check module 249 predicts a matching for the cell of objects 502 and 512 if the score of objects 502 and 512 in the first score matrix in FIG. 5A is less than thresh_a_sc and the score of objects 502 and 512 in the second score matrix in FIG. 5B is less than thresh_b_sc. The conflict check module 249 predicts no matching for the cell of objects 502 and 512 if the score of objects 502 and 512 in the first score matrix in FIG. 5A is greater than thresh_a_sc or the score of objects 502 and 512 in the second score matrix in FIG. 5B is greater than thresh_b_sc. Then, the edge node obtains the fused association matrix after determining correspondence for conflicting cells.

It should be understood that embodiments described herein are directed to methods and systems for matching objects in collaborative perception messages using multiple adaptive thresholds. The method includes calculating a first adaptive threshold based on uncertainty of a first parameter of a first collaborative perception message (CPM) and uncertainty of the first parameter of a second CPM, calculating a second adaptive threshold based on uncertainty of a second parameter of the first CPM and uncertainty of the second parameter of the second CPM, obtaining a first association matrix by filtering out one or more pairs whose score is greater than the first adaptive threshold, obtaining a second association matrix by filtering out one or more pairs whose score is greater than the second adaptive threshold, obtaining a fused association matrix based on the first association matrix and the second association matrix, and implementing a fusion algorithm on the fused associated matrix to obtain correspondence identification among objects.

The present disclosure fully exploits current CPM structure for multiple vehicles to achieve better collaborative perception. Multi-feature thresholds related to different parameters effectively prune false matches that Hungarian algorithm may not be able to filter out. Utilization of multi-feature thresholds enhances accuracy of matching objects in CPMs.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
    calculating a first adaptive threshold based on uncertainty of a first parameter of a first collaborative perception message (CPM) from a first node and uncertainty of the first parameter of a second CPM from a second node;
    calculating a second adaptive threshold based on uncertainty of a second parameter of the first CPM and uncertainty of the second parameter of the second CPM;
    calculating scores for pairs of objects in a first score matrix with respect to a distance between each of the pairs, in which each of the pairs of objects includes one object in the first CPM and one object in the second CPM;
    obtaining a first association matrix by filtering out one or more pairs whose score is greater than the first adaptive threshold in the first score matrix;
    calculating scores for pairs of objects in a second score matrix with respect to a difference in headings between each of the pairs, in which each of the pairs of objects includes one object in the first CPM and one object in the second CPM;
    obtaining a second association matrix by filtering out one or more pairs whose score is greater than the second adaptive threshold in the second score matrix;
    obtaining a fused association matrix based on the first association matrix and the second association matrix;
    implementing a fusion algorithm on the fused associated matrix to obtain correspondence identification among objects; and
    controlling a vehicle to autonomously drive based on the correspondence identification.

2. The method of claim 1, wherein obtaining the fused association matrix comprises:
    obtaining a conflict checking function;
    calculating a first adaptive conflict threshold and a second adaptive conflict threshold based on conflict elements between the first association matrix and the second association matrix and the conflict checking function; and
    obtaining the fused association matrix by comparing the first association matrix and the second association matrix with the first adaptive conflict threshold and the second adaptive conflict threshold.

3. The method of claim 2, wherein the conflict checking function is obtained by implementing a machine learning algorithm on conflict elements and ground truth data.

4. The method of claim 1, wherein:
    the uncertainty of the first parameter of the first CPM includes uncertainty of a location of the first node and uncertainties of locations of objects detected by the first node; and
    the uncertainty of the first parameter of the second CPM includes uncertainty of a location of the second node and uncertainties of locations of objects detected by the second node.

5. The method of claim 4, wherein:
    each of the uncertainty of the location of the first node and the uncertainty of the location of the second node is a covariance matrix; and
    each of the uncertainties of locations of objects detected by the first node and the uncertainties of locations of objects detected by the second node is a covariance matrix.

6. The method of claim 5, wherein calculating the first adaptive threshold comprises:
    calculating the first adaptive threshold based on the uncertainty of the first parameter of the first CPM and the uncertainty of the first parameter of the second CPM and a first mapping function.

7. The method of claim 6, wherein:
    the uncertainty of the second parameter of the first CPM includes uncertainty of a heading of the first node and uncertainties of headings of objects detected by the first node; and
    the uncertainty of the second parameter of the second CPM includes uncertainty of a heading of the second node and uncertainties of headings of objects detected by the second node.

8. The method of claim 7, wherein:
    each of the uncertainty of the heading of the first node and the uncertainty of the heading of the second node is a covariance matrix; and
    each of the uncertainties of headings of objects detected by the first node and the uncertainties of headings of objects detected by the second node is a covariance matrix.

9. The method of claim 8, wherein calculating the second adaptive threshold comprises:
    calculating the second adaptive threshold based on the uncertainty of the second parameter of the first CPM and the uncertainty of the second parameter of the second CPM and a second mapping function different from the first mapping function.

10. The method of claim 1, further comprising:
    calculating a third adaptive threshold based on uncertainty of a third parameter of the first CPM and uncertainty of the second parameter of the second CPM;
    obtaining a third association matrix by filtering out one or more pairs whose score is greater than the third adaptive threshold; and
    obtaining the fused association matrix based on the first association matrix, the second association matrix, and the third association matrix.

11. The method of claim 10, wherein obtaining the fused association matrix comprises:
obtaining a conflict checking function;
calculating a first adaptive conflict threshold, a second adaptive conflict threshold, and a third adaptive conflict threshold based on the conflict checking function and conflict elements among the first association matrix, the second association matrix, and the third association matrix; and
obtaining the fused association matrix by comparing the first association matrix, the second association matrix, and the third association matrix with the first adaptive conflict threshold, the second adaptive conflict threshold, and the third adaptive conflict threshold.

12. The method of claim 10, wherein:
the uncertainty of the third parameter of the first CPM includes uncertainty of a deep feature of the first node and uncertainties of deep features of objects detected by the first node; and
the uncertainty of the first parameter of the second CPM includes uncertainty of a deep feature of the second node and uncertainties of deep features of objects detected by the second node.

13. The method of claim 12, wherein:
each of the uncertainty of the deep feature of the first node and the uncertainty of the deep feature of the second node is a covariance matrix; and
each of the uncertainties of deep features of objects detected by the first node and the uncertainties of deep features of objects detected by the second node is a covariance matrix.

14. The method of claim 1, wherein each of the first node and the second node is one of a vehicle, a road side unit and an edge device.

15. A vehicle comprising:
a network interface configured to:
receive a first collaborative perception message (CPM) from a first node; and
receive a second CPM from a second node; and
a controller programmed to:
calculate a first adaptive threshold based on uncertainty of a first parameter of the first CPM and uncertainty of the first parameter of the second CPM;
calculate a second adaptive threshold based on uncertainty of a second parameter of the first CPM and uncertainty of the second parameter of the second CPM;
calculate scores for pairs of objects in a first score matrix with respect to a distance between each of the pairs, in which each of the pairs of objects includes one object in the first CPM and one object in the second CPM;
obtain a first association matrix by filtering out one or more pairs whose score is greater than the first adaptive threshold in the first score matrix;
calculate scores for pairs of objects in a second score matrix with respect to a difference in headings between each of the pairs, in which each of the pairs of objects includes one object in the first CPM and one object in the second CPM;
obtain a second association matrix by filtering out one or more pairs whose score is greater than the second adaptive threshold in the second score matrix;
obtain a fused association matrix based on the first association matrix and the second association matrix;
implement a fusion algorithm on the fused associated matrix to obtain correspondence identification among objects; and
control the vehicle to autonomously drive based on the correspondence identification.

16. The vehicle of claim 15, wherein the controller is further programmed to:
obtain a conflict checking function;
calculate a first adaptive conflict threshold and a second adaptive conflict threshold based on conflict elements between the first association matrix and the second association matrix and the conflict checking function; and
obtain the fused association matrix by comparing the first association matrix and the second association matrix with the first adaptive conflict threshold and the second adaptive conflict threshold.

17. The vehicle of claim 15, wherein:
the uncertainty of the first parameter of the first CPM includes uncertainty of a location of the first node and uncertainties of locations of objects detected by the first node; and
the uncertainty of the first parameter of the second CPM includes uncertainty of a location of the second node and uncertainties of locations of objects detected by the second node.

18. The vehicle of claim 17, wherein:
each of the uncertainty of the location of the first node and the uncertainty of the location of the second node is a covariance matrix; and
each of the uncertainties of locations of objects detected by the first node and the uncertainties of locations of objects detected by the second node is a covariance matrix.

19. The vehicle of claim 15, wherein:
the uncertainty of the second parameter of the first CPM includes uncertainty of a heading of the first node and uncertainties of headings of objects detected by the first node; and
the uncertainty of the second parameter of the second CPM includes uncertainty of a heading of the second node and uncertainties of headings of objects detected by the second node.

20. The vehicle of claim 19, wherein:
each of the uncertainty of the heading of the first node and the uncertainty of the heading of the second node is a covariance matrix; and
each of the uncertainties of headings of objects detected by the first node and the uncertainties of headings of objects detected by the second node is a covariance matrix.

* * * * *

UNITED STATES PATENT AND TRADEMARK OFFICE
CERTIFICATE OF CORRECTION

| | |
|---|---|
| PATENT NO. | : 12,062,282 B2 |
| APPLICATION NO. | : 17/498238 |
| DATED | : August 13, 2024 |
| INVENTOR(S) | : Hansi Liu, Hongsheng Lu and Rui Guo |

It is certified that error appears in the above-identified patent and that said Letters Patent is hereby corrected as shown below:

In the Specification

In Column 10, Line(s) 4, delete "go" and insert --g( )--, therefor.
In Column 16, Line(s) 12, delete "go" and insert --g( )--, therefor.

Signed and Sealed this
Twenty-fourth Day of September, 2024

Katherine Kelly Vidal
*Director of the United States Patent and Trademark Office*